United States Patent
Kashitani

(10) Patent No.: US 9,345,964 B2
(45) Date of Patent: May 24, 2016

(54) VIDEO GAME PROCESSING APPARATUS AND VIDEO GAME PROCESSING PROGRAM

(75) Inventor: Yoshiki Kashitani, Tokyo (JP)

(73) Assignee: KABUSHIKI KAISHA SQUARE ENIX (ALSO TRADING AS SQUARE ENIX CO., LTD.), Tokyo (JP)

(*) Notice: Subject to any disclaimer, the term of this patent is extended or adjusted under 35 U.S.C. 154(b) by 482 days.

(21) Appl. No.: 13/483,518

(22) Filed: May 30, 2012

(65) Prior Publication Data

US 2012/0309480 A1     Dec. 6, 2012

(30) Foreign Application Priority Data

Jun. 3, 2011   (JP) ................. 2011-125767

(51) Int. Cl.
*A63F 9/24*     (2006.01)
*A63F 13/40*     (2014.01)

(52) U.S. Cl.
CPC ........... *A63F 13/10* (2013.01); *A63F 2300/303* (2013.01); *A63F 2300/308* (2013.01); *A63F 2300/638* (2013.01); *A63F 2300/65* (2013.01); *A63F 2300/807* (2013.01)

(58) Field of Classification Search
CPC A63F 13/10; A63F 2300/807; A63F 2300/65
USPC .................................... 463/1, 30, 8
See application file for complete search history.

(56) References Cited

U.S. PATENT DOCUMENTS

| | | | |
|---|---|---|---|
| 6,454,653 B1 * | 9/2002 | Kawazu | ........................ 463/43 |
| 8,012,007 B2 | 9/2011 | Yoshida | |
| 2004/0259613 A1 | 12/2004 | Machida | |
| 2010/0075761 A1 | 3/2010 | Lord et al. | |
| 2010/0184498 A1 | 7/2010 | Takahashi et al. | |
| 2010/0292008 A1 | 11/2010 | Matsumura | |

FOREIGN PATENT DOCUMENTS

| | | |
|---|---|---|
| EP | 2226105 | 9/2010 |
| JP | 11-179055 | 7/1999 |

(Continued)

OTHER PUBLICATIONS

Extended European Search Report from the European Patent Office (EPO) in European Patent Application No. 12170091.8, dated Sep. 21, 2012.

(Continued)

*Primary Examiner* — Paul A D'Agostino
(74) *Attorney, Agent, or Firm* — Greenblum & Bernstein, P.L.C.

(57) ABSTRACT

In a video game processing apparatus, it is determined whether a player character encounters an enemy character on a movement field or not in accordance with a predetermined rule. A predetermined event game is provided in a case where the player character encounters the enemy character. One is determined from plural determination results on the basis of the content of an operation of a player in the predetermined event game. A battle start timing setup, in which a battle is started in an advantageous situation of the player character, is selected from plural battle start timing setups in a case where it is determined to be a specific determination result. The battle control information is updated by carrying out the selected battle start timing setup. Progress of the battle is controlled by starting the battle on the basis of the updated battle control information.

13 Claims, 10 Drawing Sheets

(56) References Cited

FOREIGN PATENT DOCUMENTS

| JP | 2005-152040 | 6/2005 |
|---|---|---|
| JP | 2009-233098 | 10/2009 |
| JP | 2010-088675 | 4/2010 |
| JP | 2011-528946 | 12/2011 |
| WO | 2010/011757 | 1/2010 |

OTHER PUBLICATIONS

U.S. Appl. No. 13/298,589 to Yoichi Kuroda et al., filed Nov. 17, 2011.

Japan Office Action in Japanese Patent Application No. 2011-125767, dated Jun. 18, 2013, along with an english translation thereof.

Fighting Studio, "Capcom ▲ R ▲ Kampekikoryaku Series ▲ 24 ▼ Breath of Fire V Dragon Quarter Kanzenkoryaku Guide", Japan, Capcom Co., Ltd., Ist Printing, pp. 16 and 44-46 (Jan. 10, 2003), along with a partial English language translation.

"Final Fantasy IX Ultimania", Japan, Square Enix Co., Ltd., First Edition & $6^{th}$ Printing, pp. 48-49 (Jul. 20, 2005), along with a partial English language translation.

Office Action from European Patent Office (EPO) in European Patent Application No. 12170091.8, dated Apr. 11, 2014.

Office Action from Japan Patent Office (JPO) in Japanese Patent Appl. No. 2013-213134, dated Jun. 30, 2015, along with an English translation thereof.

"Final Fantasy XIII", Dengeki PlayStation, vol. 16, No. 4, ASCII Media Works Inc., pp. 10 (Jan. 15, 2010), along with an English translation thereof.

\* cited by examiner

Fig. 2

ENEMY CHARACTER INFORMATION

| ENEMY CHARACTER ID | NAME | APPEARANCE DISTANCE [m] (0 TO 100) | BREAKAWAY DISTANCE [m] (-1 TO 200) | ... | ENCOUNTER VALUE | | |
|---|---|---|---|---|---|---|---|
| | | | | | NORMAL ENCOUNTER VALUE (-1 TO 1000) | SEARCH ENCOUNTER VALUE (-1 TO 1000) | ALERT ENCOUNTER VALUE (-1 TO 1000) |
| 1 | PANTHER 01 | NORMAL: 50 SEARCH: 40 ALERT: 30 | NORMAL: 100 SEARCH: 90 ALERT: 80 | ... | 0 | 0 | 90 |
| 2 | PANTHER 02 | NORMAL: 40 SEARCH: 30 ALERT: 20 | NORMAL: 100 SEARCH: 90 ALERT: -1 | ... | 0 | 0 | -1 |
| ... | ... | ... | ... | ... | ... | ... | ... |

Fig. 3

ENCOUNTER TYPE RATE MANAGING TABLE

| ENCOUNTER TYPE | NORMAL ENCOUNTER | SEARCH ENCOUNTER | ALERT ENCOUNTER |
|---|---|---|---|
| BASIC ENCOUNTER VALUE | 90 | 10 | 0 |
| ENCOUNTER VALUE OF ENEMY CHARACTER | 0 | 0 | 90 |
| SUM TOTAL | 90 | 10 | 90 |
| RATE [%] | 47 | 6 | 47 |

CLOCK OBJECT MANAGING TABLE

| ELAPSED TIME [SEC] | PREDETERMINED TIME [SEC] | ANGULAR VELOCITY [°/SEC] | AREA SETUP | | MOVABLE RANGE | ... |
| --- | --- | --- | --- | --- | --- | --- |
| | | | SAFE AREA | NORMAL AREA | | |
| 10 | 60 | 6 | 30 | 70 | 360 degrees | ... |

Fig. 7

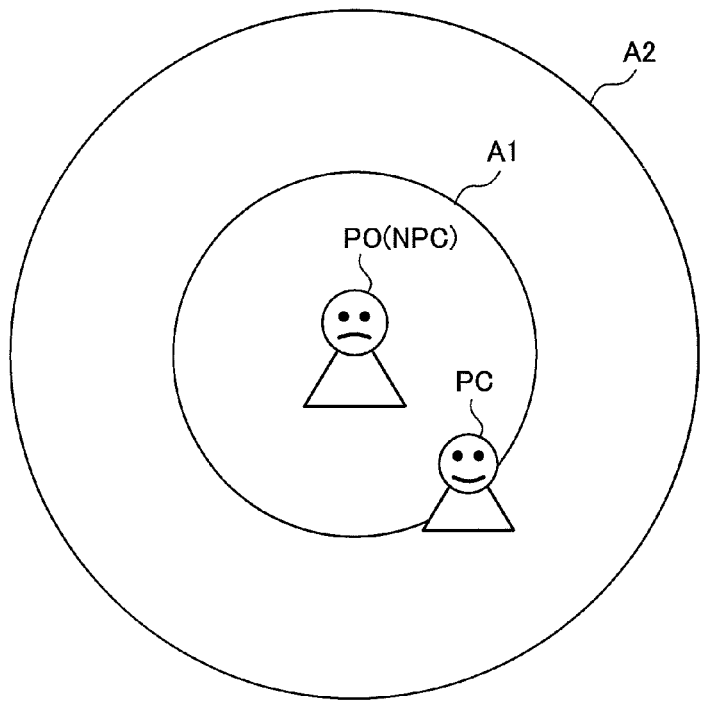

Fig. 8

BATTLE START TIMING SETUP

| NAME | SETUP CONTENT | ... |
|---|---|---|
| PREEMPTIVE BATTLE IN | ·Player character makes preemptive attack.<br>·ATB of player character = MAX.<br>·There is haste effect (20 to 30 seconds).<br>·There is chain bonus of 150% (endurance: 15 seconds) for all of enemy characters.<br>·There is additional effect such as application | ... |
| NORMAL BATTLE IN | ·Attack order is determined in accordance with parameters for each character.<br>·Each of enemy characters starts battle with predetermined state. | ... |
| SURPRISE ATTACK BATTLE IN | ·Enemy character makes preemptive attack.<br>·ATB of Player character = 0.<br>·There is slow effect (20 to 30 seconds).<br>·There is haste effect (15 seconds) for all of enemy characters.<br>·There is additional effect such as application of poison in accordance with enemy character (there is no effect in a case where player character has invalidation resistance). | ... |

VIDEO GAME PROCESSING APPARATUS AND VIDEO GAME PROCESSING PROGRAM

CROSS REFERENCE TO RELATED APPLICATION

The present disclosure relates to subject matter contained in Japanese Patent Application No. 2011-125767 filed on Jun. 3, 2011, the disclosure of which is expressly incorporated herein by reference in its entirety.

BACKGROUND OF THE INVENTION

1. Field of the Invention

The present invention relates to technique to control progress of a video game.

2. Description of the Related Art

Heretofore, various video games including a video game called an RPG (role-playing game: a game in which a player plays a role of a character in a world of the game, and accomplishes a predetermined object while enjoying a process that the character grows through various experiences) and a simulation game have been provided.

Most of video game processing apparatuses for carrying out such a video game realize a battle between a player character operated in response to an operation of a player and a character controlled in accordance with a control program by means of the video game processing apparatus without operations of the player (hereinafter, referred to as an "enemy character").

Some of systems (battle systems) that realize a battle between a player character and an enemy character adopt a specification (spec) in which the enemy character appears in accordance with movement or a position of the player character (see, for example, Japanese Patent Application Publication No. 2009-233098, which is referred to as "Patent Literature 1").

Such a battle system may adopt a realization method in which, in a case where a player character encounters an enemy character when the player character moves on a movement field (that is, a field on which the player character moves), the player character and the enemy character shift to a battle field (that is, a field on which the player character carries out a battle against the enemy character) to start a battle. Further, it is often thought that a status at the start of a battle is differentiated in accordance with a positional relationship of the respective characters on the movement field or the like. However, it is desired a system capable of preparing variations in states at the start of a battle in accordance with the content of an operation of a player on the movement field.

SUMMARY OF THE INVENTION

The present invention has been made in order to solve the problem described above, and it is an object of the present invention to be capable of carrying out control in which variations in situations at the start of a battle of respective characters can be prepared on the basis of an operation of a player when to shift from a movement field to a battle field.

In order to achieve the above object, in one aspect of the present invention, the present invention is directed to a video game processing apparatus for controlling progress of a video game by causing a display device to display a movement field and a battle field on a display screen of the display device in accordance with the progress of the video game. A player character of the video game moves on the movement field, and carries out a battle against an enemy character on the battle field. The video game processing apparatus according to the present invention includes a battle control information memory for storing battle control information therein, the battle control information containing player character information on the player character and enemy character information on the enemy character, the battle control information being used for controlling the battle on the battle field.

The video game processing apparatus also includes an encounter determiner for determining whether the player character encounters an enemy character on the movement field or not in accordance with a predetermined rule.

The video game processing apparatus also includes an event game provider for providing a predetermined event game in a case where the encounter determiner determines that the player character encounters the enemy character, any one determination result being determined from plural kinds of determination results on the basis of the content of an operation of a player in the predetermined event game, the plural kinds of determination results being prepared in advance.

The video game processing apparatus also includes a battle start timing setup selector for selecting a first battle start timing setup from plural kinds of battle start timing setups in a case where it is determined to be a specific determination result in the event game, in the first battle start timing setup, battle start timing being set up so that a battle is started in a situation that the player character is in an advantageous state, the plural kinds of battle start timing setups being prepared in advance as initial setups at the start of a battle.

The video game processing apparatus also includes a battle control information updater for updating the battle control information by carrying out the first battle start timing setup selected by the battle start timing setup selector.

The video game processing apparatus also includes a battle controller for controlling progress of the battle by starting the battle between the player character and the enemy character on the battle field on the basis of the updated battle control information after the battle control information updater updates the battle control information.

By configuring the video game processing apparatus as described above, it becomes possible to carry out control in which variations in situations at the start of a battle of respective characters can be prepared on the basis of an operation of a player when to shift from the movement field to the battle field.

In the video game processing apparatus according to the present invention, it is preferable that the event game provider includes: a presence object display controller for displaying a presence object in a case where the encounter determiner determines that the player character encounters the enemy character, the presence object representing presence of the enemy character at a presence position of the enemy character on the movement field; a clock object display controller for displaying a clock object on the display screen, the clock object visibly representing remaining time information, the remaining time information indicating a remaining time from the time when the player character encountered the enemy character to the time when a predetermined time elapses; and a contact determiner for determining whether the player character comes into contact with the enemy character on the movement field by confirming whether the player character comes into contact with the presence object or not, wherein the battle start timing setup selector determines to be the specific determination result in a case where the contact determiner determines that the player character comes into contact with the enemy character before the predetermined time elapses.

In the video game processing apparatus according to the present invention, it is preferable that the battle start timing setup selector selects a second battle start timing setup from the plural kinds of battle start timing setups in a case where the contact determiner determines that the player character does not come into contact with the enemy character before the predetermined time elapses, in the second battle start timing setup, battle start timing being set up so that a battle is started in a situation that the player character is in a disadvantageous state.

In the video game processing apparatus according to the present invention, it is preferable that the clock object display controller displays another clock object on the display screen, the another clock object visibly representing another remaining time information, the another remaining time information representing a first remaining time and a second remaining time, the first remaining time indicating a period of time until a first deadline elapses, the first deadline being a deadline set up before the predetermined time elapses after the player character encounters the enemy character, the second remaining time indicating a period of time from the time when the first remaining time is expired to the time when the predetermined time elapses, wherein the battle start timing setup selector selects a battle start timing setup, in which a battle is started in a situation that the player character is in an advantageous state, in a case where the contact determiner determines that the player character comes into contact with the enemy character before the first remaining time is expired, and wherein the battle start timing setup selector selects a third battle start timing setup in a case where the contact determiner determines that the player character comes into contact with the enemy character after the first remaining time is expired and before the second remaining time is expired, in the third battle start timing setup, battle start timing being set up so that a battle is started in a situation that both the player character and the enemy character are in a fair state.

In the video game processing apparatus according to the present invention, it is preferable that the video game processing apparatus further includes: a character action controller for controlling an action of the player character on the movement field in response to an operation by the player; and a display form changer for changing a display form of the player character into a state that the player character is equipped with a predetermined item in a case where the encounter determiner determines that the player character encounters the enemy character, wherein the contact determiner includes a contact mode determiner for determining, in a case where it is determined that the player character comes into contact with the enemy character, whether the contact is contact using the predetermined item or not, wherein the battle start timing setup selector selects the first battle start timing setup in which the battle start timing is set up so that a battle is started in a situation that the player character is in an advantageous state in a case where a determination result by the contact mode determiner indicates that the contact of the player character with the enemy character is the contact using the predetermined item, and wherein the battle start timing setup selector selects the third battle start timing setup in which the battle start timing being set up so that a battle is started in a situation that both the player character and the enemy character are in a fair state in a case where the determination result by the contact mode determiner indicates that the contact of the player character with the enemy character is not the contact using the predetermined item.

In the video game processing apparatus according to the present invention, it is preferable that the video game processing apparatus further includes: a clock object information memory for storing clock object information, the clock object information being information on the clock object containing the predetermined time; and a predetermined time updater for updating the predetermined time on the basis of at least one of information on the movement field, the player character information and the enemy character information, wherein the clock object display controller displays the clock object on the display screen on the basis of the clock object information stored in the clock object information memory.

In the video game processing apparatus according to the present invention, it is preferable that the video game processing apparatus further includes: a distance specifier for specifying a distance between the player character and the presence object on the movement field; and a distance determiner for determining whether or not the distance specified by the distance specifier is a predetermined distance or longer, wherein, in a case where the distance determiner determines that the distance between the player character and the presence object is the predetermined distance or longer, the presence object display controller erases the presence object from the movement field, and the clock object display controller terminates display of the clock object.

In the video game processing apparatus according to the present invention, it is preferable that the video game processing apparatus further includes: a condition satisfaction determiner for determining whether the player character information satisfies a predetermined condition or not before the presence object display controller displays the presence object in a case where the encounter determiner determines that the player character comes into contact with the enemy character, wherein the encounter determiner carries out the encounter determination in a case where the condition satisfaction determiner determines that the player character information satisfies the predetermined condition, and wherein the battle start timing setup selector selects the second battle start timing setup in which the battle start timing is set up so that a battle is started in a situation that the player character is in a disadvantage state in a case where the condition satisfaction determiner determines that the player character information does not satisfy the predetermined condition.

In the video game processing apparatus according to the present invention, it is preferable that the encounter determination by the encounter determiner includes encounter determination between a group of enemy characters constituted by a plurality of enemy characters and the player character, and wherein the predetermined time updater updates the predetermined time on the basis of the number of the plurality of enemy characters.

In the video game processing apparatus according to the present invention, it is preferable that the clock object display controller includes: a clock hand; an initial position of the clock hand; and an action end position of the clock hand, wherein the clock object display controller displays an object on the display screen as the clock object, the object operating in accordance with remaining time until the predetermined time elapses, the object also operating so that the clock hand is positioned at the action end position of the clock hand when the remaining time is expired.

Moreover, in another aspect of the present invention, the present invention is directed to a video game processing program product for causing a video game processing apparatus to control an operation of a video game. In this case, the video game processing apparatus controls progress of a video game by causing a display device to display a movement field and a battle field on a display screen of the display device in accordance with progress of the video game. A player character moves on a movement field, and carries out a battle against an enemy character on the battle field. The video game processing program product causes the video game processing apparatus to execute steps including determining whether the player character encounters the enemy character on the movement field or not in accordance with a predetermined rule.

The steps also include displaying a presence object in a case where it is determined in the determining whether the player character encounters the enemy character that the player character encounters the enemy character, the presence object representing presence of the enemy character at a presence position of the enemy character on the movement field.

The steps also include displaying a clock object on the display screen, the clock object visibly representing remaining time information, the remaining time information indicating a remaining time from the time when the player character encountered the enemy character to the time when a predetermined time elapses.

The steps also include determining whether the player character comes into contact with the enemy character on the movement field by confirming whether the player character comes into contact with the presence object or not.

The steps also include selecting a first battle start timing setup from plural kinds of battle start timing setups in a case where it is determined in the determining whether the player character comes into contact with the enemy character that the player character comes into contact with the enemy character before the predetermined time elapses, in the first battle start timing setup, battle start timing being set up so that a battle is started in a situation that the player character is in an advantageous state, the plural kinds of battle start timing setups being prepared in advance as initial setups at the start of a battle.

The steps also include updating battle control information stored in battle control information memory by carrying out the battle start timing setup selected in the selecting a first battle start timing setup, the battle control information containing player character information on the player character and enemy character information on the enemy character, the battle control information being used for controlling a battle between the player character and the enemy character on the battle field.

The steps also include controlling progress of the battle by starting the battle between the player character and the enemy character on the battle field on the basis of the updated battle control information after the battle control information is updated in the updating the battle control information.

According to the present invention, it is possible to carry out control in which variations in situations at the start of a battle of respective characters can be prepared on the basis of an operation of a player when to shift from a movement field to a battle field.

BRIEF DESCRIPTION OF THE DRAWINGS

The foregoing and other objects, features and advantages of the present invention will become more readily apparent from the following detailed description of a preferred embodiment of the present invention that proceeds with reference to the appending drawings:

FIG. 2 is an explanatory drawing for showing an example of a storage state of enemy character information;

FIG. 3 is an explanatory drawing for showing an example of a storage state of encounter type rate information;

FIG. 7 is an explanatory drawing for explaining a process carried out by a control section on the basis of a positional relationship between an enemy character and a player character after the player character encounters the enemy character;

FIG. 8 is an explanatory drawing for showing an example of a storage state of battle start timing setup;

DETAILED DESCRIPTION OF THE INVENTION

Hereinafter, one embodiment of the present invention will be described with reference to the appending drawings.

Figure 1:
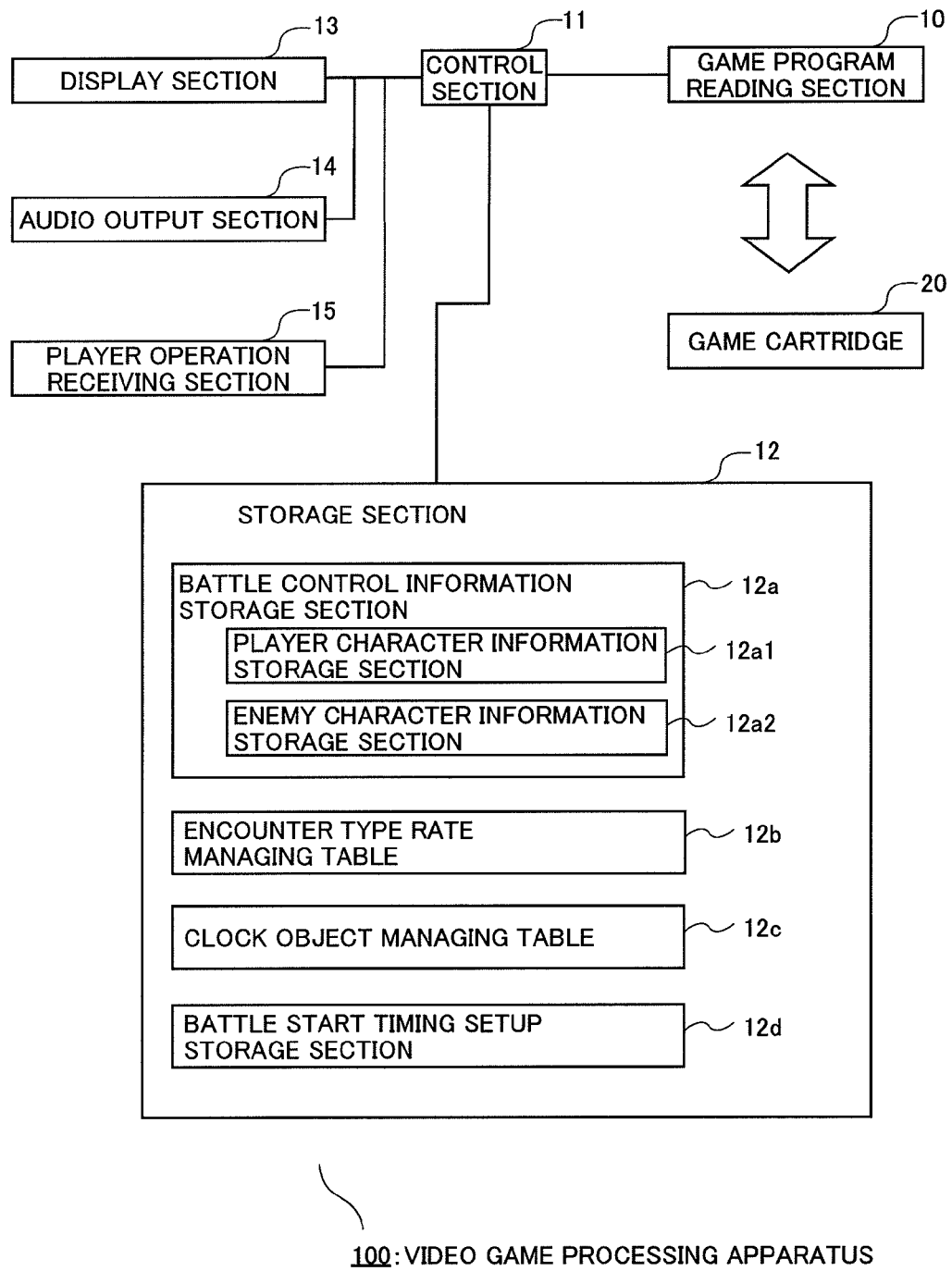
FIG. 1 is a block diagram showing a configuration example of a video game processing apparatus.

FIG. 1 is a block diagram showing a configuration example of a video game processing apparatus 100 according to one embodiment of the present invention. As shown in FIG. 1, the video game processing apparatus 100 includes: a game program reading section 10; a control section 11; a storage section 12; a display section 13; an audio outputting section 14; and a player operation receiving section 15.

The game program reading section 10 detachably receives a game cartridge 20 into which a storage medium is embedded. A game program is stored in the storage medium. The game program reading section 10 reads out a necessary game program from the storage medium in the inserted game cartridge 20. In this regard, in this embodiment, a video game program classified into an RPG is stored in the storage medium embedded into the game cartridge 20. However, a category to which the video game program stored in the storage medium embedded into the game cartridge 20 belongs is not limited to the RPG, and the video game program (that is, the present invention) can be applied to various kinds of categories in which a process corresponding to appearance of an enemy character and a battle against the enemy character, such as an action game and the like (which can adjust advantage or disadvantage between a player character and an enemy character by a change of any of various setups) is carried out.

The control section 11 has a function to carry out the game program read out by the game program reading section 10, and to carry out various kinds of controls for causing a video game to proceed in response to operations by a player.

In particular, the control section 11 according to the present embodiment has a function to carry out various kinds of processing for controlling progress of the video game by causing the display section 13 to display, on a display screen thereof, a movement field on which the player character moves and a battle field on which the player character and an enemy character carry out a battle in accordance with progress of the video game. In particular, the control section 11 carries out necessary control for: an encounter determining process of determining whether a player character encounters an enemy character on the movement field or not in accordance with a predetermined rule; a presence object displaying process of displaying a presence object, which represents presence of the enemy character, at a presence position of the enemy character on the movement field in a case where it is determined at the encounter determining process that the player character encounters the enemy character; a clock object displaying process of displaying a clock object, which visibly represents remaining time information indicating a remaining time from the time when the player character encountered the enemy character to the time when a predetermined time elapses, on the display screen; a contact determining process of determining whether the player character comes into contact with the enemy character on the movement field or not by confirming whether the player character comes into contact with the presence object or not; a battle start timing setup selecting process of selecting a battle start timing setup, in which battle start timing is set up so that a battle is started in a situation that the player character is in an advantageous state, from plural kinds of battle start timing setups prepared in advance as initial setups at the start of a battle in a case where it is determined at the contact determining process that the player character comes into contact with the enemy character before a predetermined time elapses; a battle control information updating process of updating the battle control information stored in the battle control information storage section for storing the battle control information, which contains player character information on the player character and enemy character information on the enemy character and is used for controlling a battle on the battle field, by carrying out the selected battle start timing setup at the battle start timing setup selecting process; a battle controlling process of controlling progress of the battle by starting the battle between the player character and the enemy character on the battle field on the basis of the updated battle control information after the battle control information is updated at the battle control information updating process. In this regard, main processing with regard to the present invention will be described later in detail.

The storage section 12 is a storage medium for storing game programs necessary when the video game is caused to proceed and various kinds of data. The storage section 12 is configured by a nonvolatile memory such as a RAM, for example. In the storage section 12, various kinds of information registered and updated in accordance with progress of the video game, and various kinds of information used in the video game, which are read out from the storage medium embedded into the game cartridge 20, are stored.

In the present embodiment, the storage section 12 includes: a battle control information storage section 12*a*; an encounter type rate managing table 12*b*; a clock object managing table 12*c*; and a battle start timing setup storage section 12*d*.

The battle control information storage section 12*a* is a storage medium for storing battle control information used for controlling a battle on the battle field. In the present embodiment, player character information regarding the player character and enemy character information regarding enemy characters are contained in the battle control information storage section 12*a* as the battle control information. The player character information and the enemy character information are stored in a player character information storage section 12*a*1 and an enemy character information storage section 12*a*2, respectively.

Here, the player character information stored in the player character information storage section 12*a*1 contains various kinds of information on the player character, such as a name of the player character, an HP, nimbleness, equipment, possessed items, characters each of which is a family of the player character (sub character) and the like (not shown in the drawings).

Further, the enemy character information stored in the enemy character information storage section 12*a*2 contains, for every enemy character, various kinds of information on the enemy characters, such as a distance at which it is determined that the enemy character encounters the player character, a movement rule including a period of time from the time when to encounter the player character to the time when to start movement, and the like.

FIG. 2 is an explanatory drawing for showing an example of a storage state of the enemy character information stored in the enemy character information storage section 12*a*2 of the battle control information storage section 12*a*. As shown in FIG. 2, the enemy character information contains: an enemy character ID for uniquely specifying an enemy character; a name of the enemy character; an appearance distance; a breakaway distance; and an encounter value.

Here, the "appearance distance" denotes a distance (a distance from the player character on the movement field) indicating a position at which the enemy character appears when the player character encounters the enemy character (including a group of enemy characters constituted by a plurality of enemy character) in accordance with progress of the video game (hereinafter, the encounter of the player character with an enemy character may simply be referred to as "encounter" suitably). In the present embodiment, the appearance distance is set up for every type of encounter between the player character and an enemy character (encounter type). In this regard, a known method, such as a method of causing the player character to encounter an enemy character (or a group of enemy characters constituted by a plurality of enemy characters) associated with a region in which the player character is positioned with a predetermined probability in accordance with movement of the player character, is used for the encounter determination between the player character and the enemy character, for example.

In the present embodiment, there are three types as the encounter types including normal encounter, search encounter and alert encounter. Here, the normal encounter denotes a fashion of encounter, which is a basis. Further, the search encounter denotes a fashion of encounter advantageous to the player (player character), and means the case where the player finds out an enemy character in first. Moreover, the alert encounter denotes a fashion of encounter disadvantageous to the player, and means the case where the player character is found out by the enemy character in first. A method of determining (or selecting) an encounter type will be described later in detail (see FIG. 11).

Further, the "breakaway distance" denotes a distance at which the encounter between the player character and the enemy character is terminated. Namely, by causing the player character to move to a position separated from an enemy character by the breakaway distance or more when the player character encountered the enemy character, the player is allowed to avoid a battle against the encountered enemy character. Therefore, in the present embodiment, the shorter the breakaway distance is, the easily the player character breaks away. In the present embodiment, the breakaway distance is set up for every encounter type.

For example, with respect to an enemy character that is slow in action, a difference between the appearance distance and the breakaway distance is made smaller. With respect to an enemy character from which the player character hardly runs away, a difference between the appearance distance and the breakaway distance is made lager. With respect to an enemy character that the player hardly finds out, the appearance distance itself is made longer than other distances. By changing a combination between the appearance distance and the breakaway distance for every character in this manner, it is possible to generate various patterns of encounter.

In this regard, the video game processing apparatus 100 may be configured so that the movement rule of the enemy character (for example, a runaway line) is changed in accordance with a method of moving the player character for even the same enemy character.

Further, the "encounter value" denotes a value used to determine an encounter type when the player character encounters each enemy character. In the present embodiment, a normal encounter value, a search encounter value and an alert encounter value are set up for every encounter type. In this regard, if there is no need to characterize any enemy character, "0" may be set up to all of the encounter values. Further, in the present embodiment, "−1" may be set up to any encounter value. In this case, an encounter type to which "−1" is set up is selected at 100%. In this regard, in a case where an enemy character with the encounter value to which "−1" is set up is included in a plurality of enemy characters constituting a group of enemy characters when the player character encounters the group of enemy characters, the encounter type is selected preferentially. Further, in a case where "−1" is set up to each of encounter values of different encounter types in some of a plurality of enemy characters (for example, in a case where, in enemy characters A, B, C constituting one group of enemy characters, an alert encounter value of the enemy character A is "−1", a normal encounter value of the enemy character B is "−1", and a search encounter value of the enemy character C is "−1"), the control section 11 selects one encounter type in accordance with a predetermined rule (for example, in a case where the encounter values are the same, the control section 11 preferentially selects one encounter type in order of the alert encounter, the normal encounter and the search encounter).

Further, although it is not shown in the drawings, the enemy character information according to the present embodiment contains movement rules of a presence object (including a period of time from the time when a presence object is displayed to the time when to start movement) displayed on the movement field after an enemy character encounters the player character. In this regard, a presence object indicating a presence position of an enemy character on the movement field will be described later in detail (see FIG. 11).

The encounter type rate managing table 12b is a storage medium for storing encounter type rate information that is information indicating which encounter type is to be adopted when to determine an encounter type between the player character and an enemy character. In the present embodiment, the encounter type rate information updated by the control section 11 in accordance with progress of the video game is stored in the encounter type rate managing table 12b.

FIG. 3 is an explanatory drawing for showing an example of a storage state of the encounter type rate information stored in the encounter type rate managing table 12b. As shown in FIG. 3, the encounter type rate information normally contains, for every type, a basic encounter value, an encounter value of an enemy character, a total value of the basic encounter value and the encounter value of the enemy character, and a rate of each of the total vales with respect to the whole encounter values.

Here, the "basic encounter value" denotes an encounter value that is determined in accordance with a rule set up in advance when the player character encounters an enemy character. In this regard, in the present embodiment, a basic encounter value for every encounter type is determined in a random manner using random numbers.

Further, the "encounter value of an enemy character" is read out from the enemy character information corresponding to the enemy character that the player character encountered.

In the case shown in FIG. 3, types of encounter (encounter types) between the player character and the enemy character are composed of a normal encounter of 47%, a search encounter of 6% and an alert encounter of 47%.

The clock object managing table 12c is a storage medium for storing clock object information, which is information on a clock object that visibly indicates remaining time information. The remaining time information represents a remaining time from the time when the player character encounters an enemy character to the time when a predetermined time elapses.

Figures 4, 5:
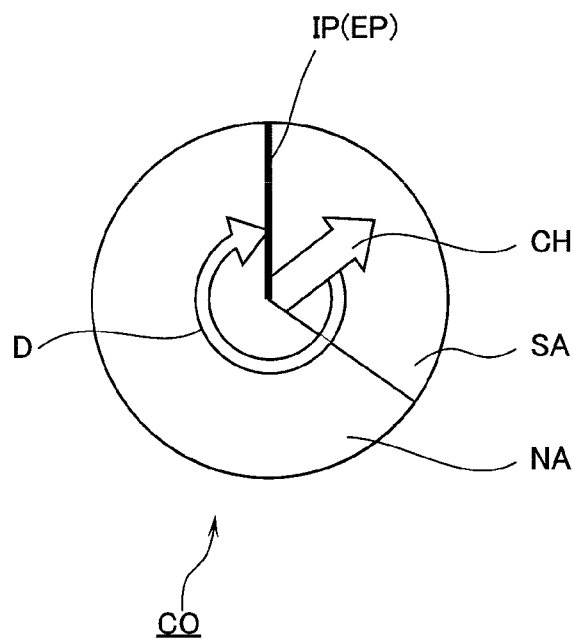
FIG. 4 is an explanatory drawing for explaining a clock object.
FIG. 5 is an explanatory drawing for showing an example of a storage state of clock object information.

FIG. 4 is an explanatory drawing for explaining clock object. As shown in FIG. 4, a clock object CO according to the present embodiment is an object including: a clock hand CH; an initial position IP of the clock hand CH; an action end position EP of the clock hand CH (in FIG. 4, the same position as the initial position IP); a safe area SA; and a normal area NA. In the present embodiment, the control section 11 controls the clock object CO so that the clock hand CH points to the action end position EP when a predetermined time elapses by causing the clock hand CH included in the clock object CO to move in clockwise direction (direction D) from the initial position IP in accordance with elapsed time. This makes it possible to provide remaining time information, which indicates a remaining time until a predetermined time elapses from the time when the player character encountered an enemy character, to the player.

Further, in the present embodiment, the control section 11 allows a player to recognize processes carried out in accordance with elapsed time by distinguishably displaying various kinds of areas provided in the clock object (in the present embodiment, the safe area SA and the normal area NA). In this regard, in the present embodiment, the control section 11 carries out a process to fix the position of the enemy character after the encounter while the clock hand CH is positioned within the safe area SA, and a process to move the position of the enemy character after the encounter while the clock hand CH is positioned within the normal area NA in accordance with the movement rule contained in the enemy character information, for example.

Then, the clock object CO indicates timing after the clock hand CH makes a cycle around the clock object CO as a forcible battle start time (in the present embodiment, time when a battle is started without contact of the player character with the enemy character after encounter). In this regard, the video game processing apparatus 100 may be configured so that the "forcible battle start time" is calculated on the basis of a predetermined parameter contained in the enemy character information and/or the determined encounter type. Alternatively, the video game processing apparatus 100 may be configured so that the "forcible battle start time" is calculated in accordance with a predetermined parameter contained in the player character information and/or a region in which the player character is positioned on the movement field.

FIG. 5 is an explanatory drawing for showing an example of a storage state of the clock object information in the clock object managing table 12c. As shown in FIG. 5, the clock object information according to the present embodiment contains: an elapsed time; a predetermined time; an angular velocity; an area setup; and a movable range.

Here, the "elapsed time" denotes a period of time that elapses since the player character encountered the enemy character. In the present embodiment, a period of time measured by a time measuring device (that is, a timer) included in the video game processing apparatus 100 is reflected as the elapsed time.

Further, the "predetermined time" denotes a period of time set up in advance as a period of time from the time when the player character encountered an enemy character to the time when a battle is start forcibly. In the present embodiment, this predetermined time becomes a period of time when the clock hand CH makes a cycle around the clock object CO (that is, the period of time from the time when the clock hand CH starts to move from the initial position IP toward the direction D to the time when the clock hand CH arrives at the action end position EP).

Further, the "angular velocity" denotes an angular velocity of the clock hand CH in the clock object CO. A value obtained by dividing the movable range of the clock hand CH (which is a range corresponding to a movement distance from the initial position IP to the action end position EP. In the present embodiment, the value is 360°) by the predetermined time (for example, 60 seconds) is inputted.

Further, the "area setup" is information representing a rate of each area that constitutes the clock object CO. In the present embodiment, the clock object CO visibly presents the remaining time information indicating two areas (safe area SA and normal area NA). The area (safe area SA) indicates a first remaining time from the time when the player character encountered the enemy character to the time when a first deadline elapses. The first deadline is a deadline set up before the predetermined time (that is, a period of time required for the clock hand CH in the clock object CO to move from the initial position IP to the action end position EP) elapses. The area (normal area NA) indicates a second remaining time from the time when the first remaining time is expired to the time when the predetermined time elapses (that is, a period of time obtained by subtracting the time required from the time when the player character encountered the enemy character to the time when the first deadline elapses from the time required for the clock hand CH of the clock object CO to move from the initial position IP to the action end position EP).

In this regard, the configuration of the clock object CO is not limited to a so-called clock, and the clock object CO may be configured so as to visibly present, to the player, the remaining time information representing a remaining time from the time when the player character encountered the enemy character to the time when the predetermined time elapses.

Figure 6:
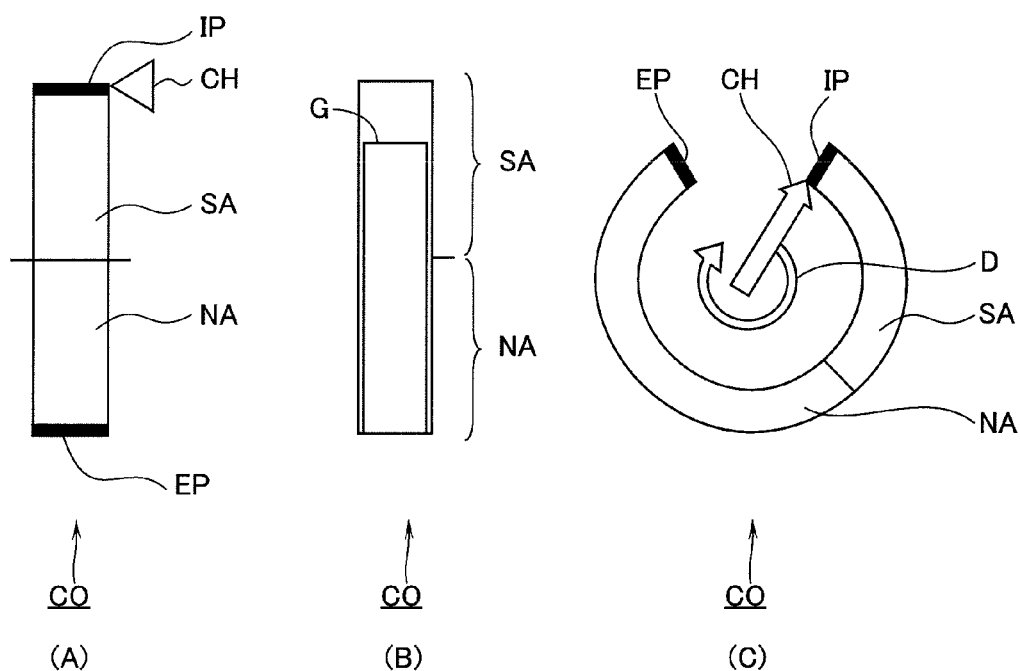
FIGS. 6A to 6C are explanatory drawings for explaining another example of the clock object information.

FIGS. 6A to 6C are explanatory drawings for explaining another example of the clock object CO.

FIG. 6A is an example of the case where a clock object is formed as a bar meter. In a case where the clock object is formed as the bar meter, the clock hand CH is configured so as to move from the initial position IP to the action end position EP positioned at a portion different from that of the initial position IP in accordance with elapse of time. This makes it possible to realize the function as the clock object.

FIG. 6B is an example of the case where a clock object is formed as a gauge. In the case where the clock object is formed as the gauge, the clock object is configured so that the gauge G reduces in accordance with elapse of time and finally becomes "0". This makes it possible to realize the function as the clock object.

FIG. 6C is an example of the case where a clock object is formed as an arc meter. In a case where the clock object is formed as the arc meter, the clock hand CH is arranged at the center of an arc, and a position indicated by the clock hand CH moves from one end of the arc to the other end thereof in accordance with elapse of time. This makes it possible to realize the function as the clock object.

In this regard, in FIGS. 6A, 6B and 6C, the case where the clock object CO indicates one of two kinds of areas (the safe area SA and the normal area NA) has been explained. However, the number of areas is not limited to two kinds. In a case where there are three kinds or more of processing content according to areas, the clock object CO may be configured so as to include three kinds or more of areas.

FIG. 7 is an explanatory drawing for explaining a process carried out by the control section 11 on the basis of a positional relationship between the enemy character NPC and the player character PC after the player character PC encountered the enemy character NPC. In the present embodiment, in a case where it is determined that the player character PC encounters the enemy character NPC, as shown in FIG. 7, the control section 11 arranges a presence object PO, which indicates presence of an enemy character, at a position according to the appearance distance (that is, a presence position of the enemy character NPC) with respect to the player character PC on the movement field. As shown in FIG. 7, the control section 11 then specifies an appearance range A1 (for example, inside of a circular range in which the position of the presence object is centered and the appearance distance of the enemy character NPC is set to a radius thereof) and a breakaway range A2 (for example, outside of a circular range in which the position of the presence object is centered and the breakaway distance of the enemy character NPC is set to a radius thereof). The appearance range A1 is based on the position of the presence object PO on the movement field.

The control section 11 then displays a clock object CO corresponding to the encounter type when the player character PC is positioned within the appearance range A1. On the other hand, in a case where it is determined that the player character PC moves to the breakaway range A2, the control section 11 determines that the player character PC avoids a battle against the enemy character NPC. The control section 11 then terminates measuring the time after encounter, and erases the clock object from the display screen. In this regard, in a case where the player character PC is positioned between the appearance range A1 and the breakaway range A2, the control section 11 interrupts measuring the time after encounter, and restart to measure the time when the player character PC moves into the appearance range A1 again.

In this regard, in the present embodiment, a battle between the player character PC and the enemy character NPC does not start at the step after the encounter but before contact. Namely, the control section 11 does not carry out any process to affect an HP or the like of the enemy character by means of an action of the player character PC on the movement field.

Further, there is no need that the number of displayed presence objects is to be the same as the number of enemy characters. Namely, in the present embodiment, in a case where it is determined that the player character PC encounters a plurality of enemy characters (that is, a group of enemy characters constituted by the plurality of enemy characters), the control section 11 does not display the plurality of enemy characters, but displays a presence object PO indicating the group of enemy characters at a position of the group of enemy characters (for example, at a position of the enemy character representative of the group of enemy characters or the like).

Further, for example, depending upon the appearance distance of the enemy character, the control section 11 may set up a position of the encountered enemy character NPC outside the display screen (that is, the control section 11 may cause the enemy character to appear at a position that is not included in the display range on the movement field, and causes the presence object PO not to be displayed in the display screen). In this regard, the video game processing apparatus 100 may be configured so that, in a case where the player character PC encounters a group of enemy characters, the control section 11 respectively adopts the longest appearance distance and the longest breakaway distance in the enemy character information of each of the plurality of enemy characters constituting the group of enemy characters (that is, the enemy character information corresponding to each of the enemy characters), or adopts an average value thereof.

The battle start timing setup storage section 12d is a storage medium for storing plural types of initial setups (including first and second battle start timing setups) when the player character PC starts a battle against the encountered enemy character NPC. In the present embodiment, the control section 11 selects one setup (or a combination of a plurality of setups) from a plurality of battle start timing setups in accordance with an action and the like of the player character from the time when the player character PC encountered the enemy character NPC to the time when the predetermined time elapses; updates the battle control information stored in the battle control information storage section 12a by carrying out the selected battle start timing setup; and controls progress of a battle by starting the battle between the player character PC and the enemy character NPC on the battle field on the basis of the updated battle control information.

FIG. 8 is an explanatory drawing for showing an example of a storage state of the battle start timing setups stored in the battle start timing setup storage section 12d. As shown in FIG. 8, each of the battle start timing setups contains a name of a battle start timing setup and the setup content.

In the present embodiment, as shown in FIG. 8, a battle start timing setup in which battle start timing is set up so that a battle is started in a situation that the player character is in an advantageous state compared with the enemy character (in the case shown in FIG. 8, a battle start timing setup regarding a name "preemptive battle in"), a battle start timing setup in which battle start timing is set up so that a battle is started in a situation that both the player character and the enemy character are in a fair state (in the case shown in FIG. 8, a battle start timing setup regarding a name "normal battle in"), and a battle start timing setup in which battle start timing is set up so that a battle is started in a situation that the player character is in a disadvantageous state (in the case shown in FIG. 8, a battle start timing setup regarding a name "surprise attack battle in") are included in the battle start timing setups. In this regard, in the present embodiment, the "battle in" means that the game screen displayed on the display screen is shifted from the movement field of the player character to the battle field against the enemy character.

The display section 13 is a display device for displaying the game screen in response to operations by the player in accordance with control by the control section 11. The display section 13 is constructed by a liquid crystal display, for example.

The audio outputting section 14 outputs audio in response to operations by the player and progress of the video game in accordance with control by the control section 11.

The player operation receiving section 15 receives operational signals in response to operations by the player via a controller constructed by a plurality of buttons, a mouse or the like, and notifies the control section 11 of its result. In the present embodiment, the player operation receiving section 15 is constructed by a touch panel.

Next, an operation of the video game processing apparatus 100 according to the present embodiment will be described.

Figure 9:
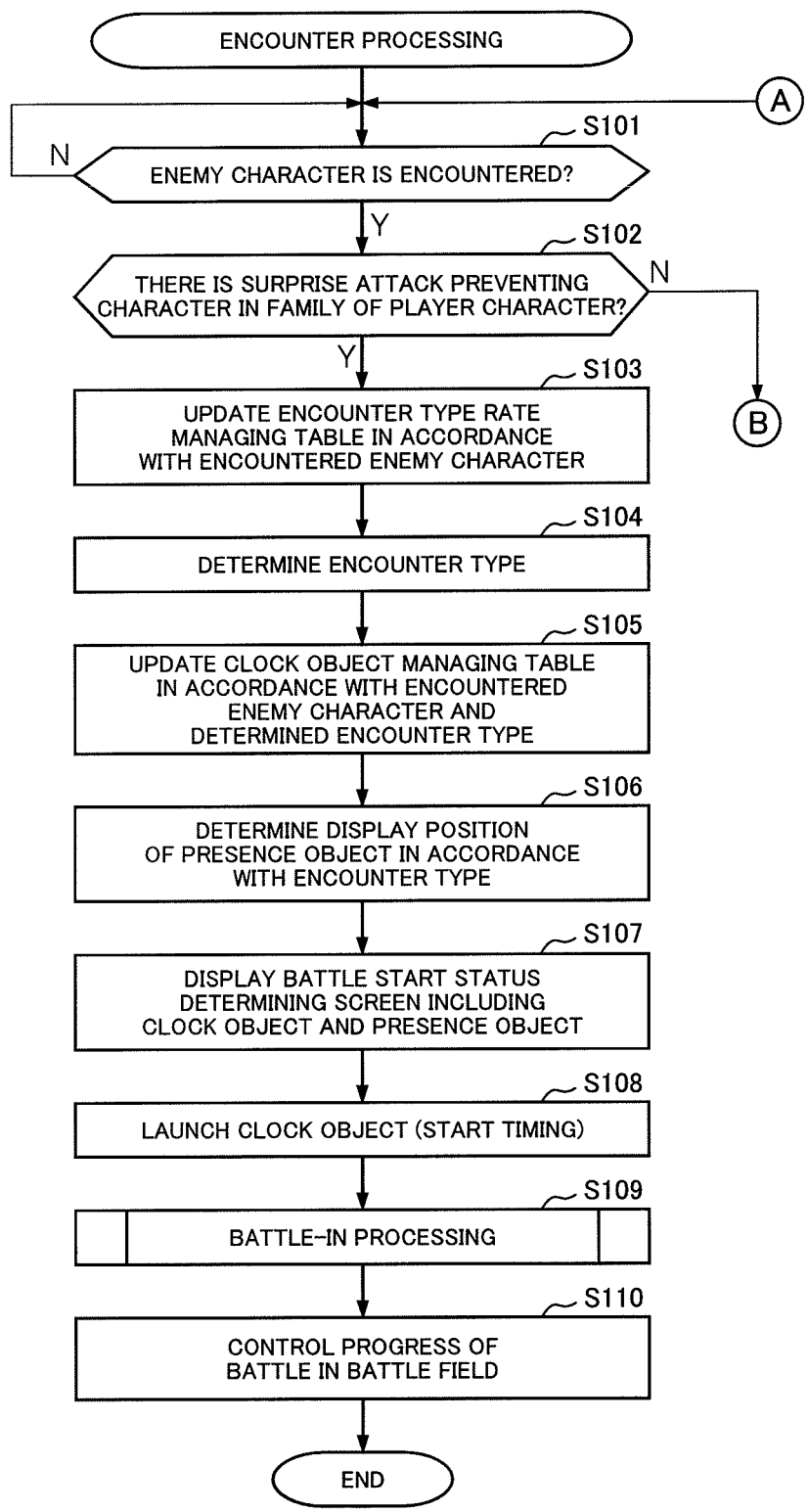
FIG. 9 is a flowchart showing an example of encounter processing.

FIG. 9 is a flowchart showing an example of encounter processing carried out by the video game processing apparatus 100. In the encounter processing, when the player character encounters an enemy character, a process to display a position of the enemy character on the movement field, a process to carry out contact determination between the player character and the enemy character on the basis of the position of the displayed enemy character, and a process to shift to the battle field are carried out. Namely, in the present embodiment, the "encounter" processing includes three steps of processes including "encounter", "contact", and "shift to a battle scene (battle in)". In this regard, general processing may be omitted.

The game processing according to the present embodiment is started when a position of the player character PC is positioned within a range in which the player character PC may encounter an enemy character NPC at a predetermined probability, for example.

Figure 10:
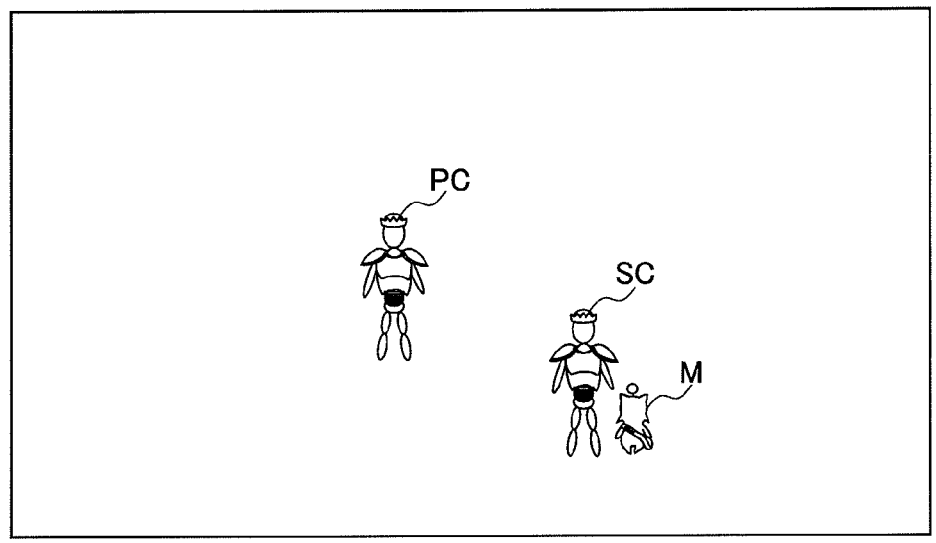
FIG. 10 is an explanatory drawing for illustrating an example of a game screen on which a movement field is displayed.

FIG. 10 is an explanatory drawing for illustrating an example of the game screen showing the movement field (hereinafter, referred to appropriately as a "movement screen"). As shown in FIG. 10, in the present embodiment, the player character PC, a sub character SC that is a family of the player character PC, and a surprise attack preventing character M are displayed on the movement screen. In this regard, the surprise attack preventing character M is a character that may not belong to the family of the player character PC in accordance with progress of the video game.

In the encounter processing, the control section 11 first determines whether the player character PC encounters an enemy character NPC (including a group of enemy characters constituted by a plurality of enemy characters NPC) or not (Step S101). In this regard, in the present embodiment, the control section 11 carries out encounter determination on the basis of an encounter condition stored in the storage section 12 (not shown in the drawings). Here, in a case where it is determined that the player character PC encounters no enemy character NPC ("No" at Step S101), the control section 11 causes a position of the player character PC to move in response to an operation of a player A, for example, and carries out the encounter determination again.

On the other hand, in a case where it is determined that the player character PC encounters an enemy character NPC ("Yes" at Step S101), the control section 11 determines whether there is a surprise attack preventing character in a family of the player character PC or not (Step S102). In this regard, in the present embodiment, in a case where a surprise attack preventing character M is positioned within a predetermined distance from the player character PC (that is, in a case where the surprise attack preventing character M is in a predetermined state), the control section 11 determines that there is a surprise attack preventing character M.

In a case where it is determined in the process at Step S102 that there is no surprise attack preventing character M ("No" at Step S102), the control section 11 causes the processing flow to proceed to a process at Step S205 in battle-in processing (will be described later) (see FIG. 13).

On the other hand, in a case where it is determined that there is a surprise attack preventing character M ("Yes" at Step S102), the control section 11 updates the encounter type rate managing table 12b on the basis of an encounter value in the enemy character information for the encountered enemy character NPC (Step S103). In this regard, in the present embodiment, the control section 11 changes the basic encounter value in the encounter type rate managing table 12b in accordance with a status of the player character PC (such as a position or a state thereof) (see FIG. 3).

When the encounter type rate managing table 12b is updated, the control section 11 determines an encounter type corresponding to the encounter between the player character PC and the enemy character NPC on the basis of a rate of each of the encounter types stored in the encounter type rate managing table 12b (see FIG. 3) (Step S104).

When the encounter type is determined, the control section 11 updates the clock object managing table 12c in accordance with the encountered enemy character NPC and the determined encounter type (Step S105). In the present embodiment, the control section 11 carries out a process similar to that when to update the encounter type rate managing table 12b. Namely, the control section 11 takes into account various kinds of information set up in the enemy character information of the encountered enemy character in addition to the basal value according to the determined encounter type, determines a predetermined time (angular velocity with respect to the predetermined time), an area setup and the like that constitute the clock object information, and updates the clock object managing table 12c in accordance with the determined content. In this regard, with respect to determination of the predetermined time, the video game processing apparatus 100 may be configured so as to change the predetermined time set up in advance on the basis of a value of a predetermined parameter even for the same enemy character. For example, the predetermined time is changed so that the lower a level of the enemy character is with respect to a level of the player character PC, the shorter the predetermined time is set up to.

In this regard, in the present embodiment, the video game processing apparatus 100 may be configured so that, in a case where the control section 11 updates the clock object managing table 12c, there is not always need to reflect the enemy character information and the control section 11 updates, when a specific condition is satisfied, the clock object information with the content associated with the satisfied condition in advance. Namely, for example, in a case where the determined encounter type is "alert encounter", the control section 11 may set up the area setups so that "safe area=0, normal area=100" regardless of other elements.

When the clock object managing table 12c is updated, the control section 11 refers to the enemy character information storage section 12a2 to determine a display position of the presence object PO (that is, a presence position of the enemy character NPC on the movement field) in accordance with the encounter type (Step S106). In the present embodiment, the control section 11 determines, as the display position of the presence object PO, a position that satisfies an appearance condition of the enemy character NPC in a range separated from the player character PC by an appearance distance of the enemy character NPC on the movement field (in a case where a plurality of positions satisfy the appearance condition, the position is selected from the plurality of positions in a random manner).

When the display position of the presence object PO is determined, the control section 11 causes the display section 13 to display a battle start status determining screen (or battle-in screen) including the clock object on the display screen (Step S107).

Figure 11:
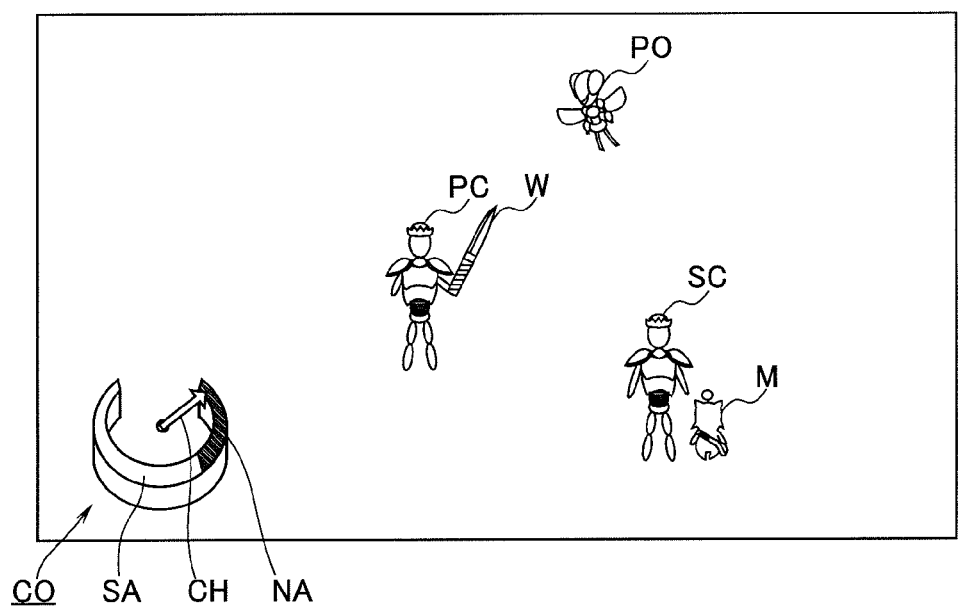
FIG. 11 is an explanatory drawing for showing an example of a battle start status determining screen.

FIG. 11 is an explanatory drawing for showing an example of the battle start status determining screen. As shown in FIG. 11, in the present embodiment, the presence object PO is displayed at the position corresponding to the appearance distance of the enemy character NPC with respect to the player character PC. In this regard, so long as the player character PC (that is, the player A) can identify the position of the encountered enemy character NPC, the presence object PO may be configured to use exterior appearance of the enemy character NPC or schematic representation of the exterior appearance of the enemy character NPC, for example. Further, the video game processing apparatus 100 may be configured so that, in a case where the player character PC encounters a group of enemy characters constituted by a plurality of enemy characters NPC, one enemy character NPC (for example, the enemy character set up in advance as a representative of the group) is selected from the group of enemy characters and exterior appearance of the selected enemy character NPC is displayed as the presence object PO.

Further, the clock object CO based upon the clock object information is displayed on the battle start status determining screen. In the present embodiment, as shown in FIG. 11, the case where the clock object CO distinguishably displays the normal area NA and the safe area SA and the remaining time information indicating a remaining time from the time when the player character PC encounters the enemy character NPC to the time when the predetermined time elapses is visibly represented by means of the clock hand CH will be described as an example.

Further, in the present embodiment, the control section 11 displays an item that the player character PC possesses on a battle start status determining screen (hereinafter, a weapon W with which the player character equips will be described as an example).

When the battle start status determining screen is displayed, the control section 11 boots up the clock object (Step S108). Namely, the control section 11 starts to measure the time, and starts a process to move the clock hand CH in accordance with elapsed time.

When the clock object is activated, the control section 11 selects one from a plurality of battle start timing setups stored in the battle start timing setup storage section 12d (or selects a combination of some battle start timing setups), and carries out battle-in processing in order to update the battle control information by carrying out the selected battle start timing setup (Step S109). In this regard, the battle-in processing will be described later in detail (see FIG. 13).

When the battle control information is updated by carrying out the battle-in processing, the control section 11 starts a battle between the player character PC and the enemy character NPC on the battle field on the basis of the updated battle control information, and controls progress of the battle. The control section 11 then terminates the processing herein (Step S110).

Figure 12:
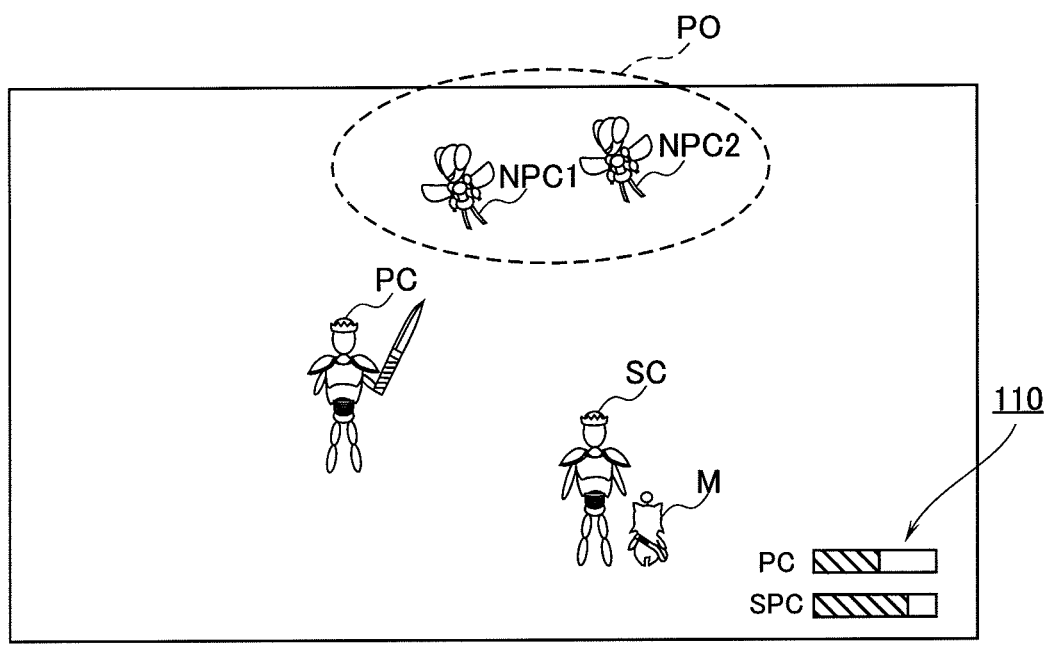
FIG. 12 is an explanatory drawing for illustrating an example of the game screen on which the battle field is displayed.

FIG. 12 is an explanatory drawing for illustrating an example of the game screen showing the battle field (hereinafter, referred to appropriately as a "battle screen"). As shown in FIG. 12, in the present embodiment, an enemy character NPC (in the present embodiment, a plurality of enemy characters NPC1, NPC2) that is a target of a battle, and a status display region 110 for displaying a status (for example, an HP and the like) of each of the player character PC and the sub character SC are displayed on the battle screen.

In the present embodiment, since a conventional method using an ATB system or the like is adopted for various kinds of processes (battle controlling processing) in a battle scene, detailed explanation thereof is omitted herein. In this regard, a configuration of the battle field to which the player character shifts from the movement field on the basis of battle-in processing (will be described later, see FIG. 13) is not limited in particular, and the case where the player character PC and another player character PC1 operated by a player B different from the player A may be arranged on the battle field, for example.

Next, the battle-in processing (at Step S109 in FIG. 9) carried out by the video game processing apparatus 100 will be described.

Figure 13:
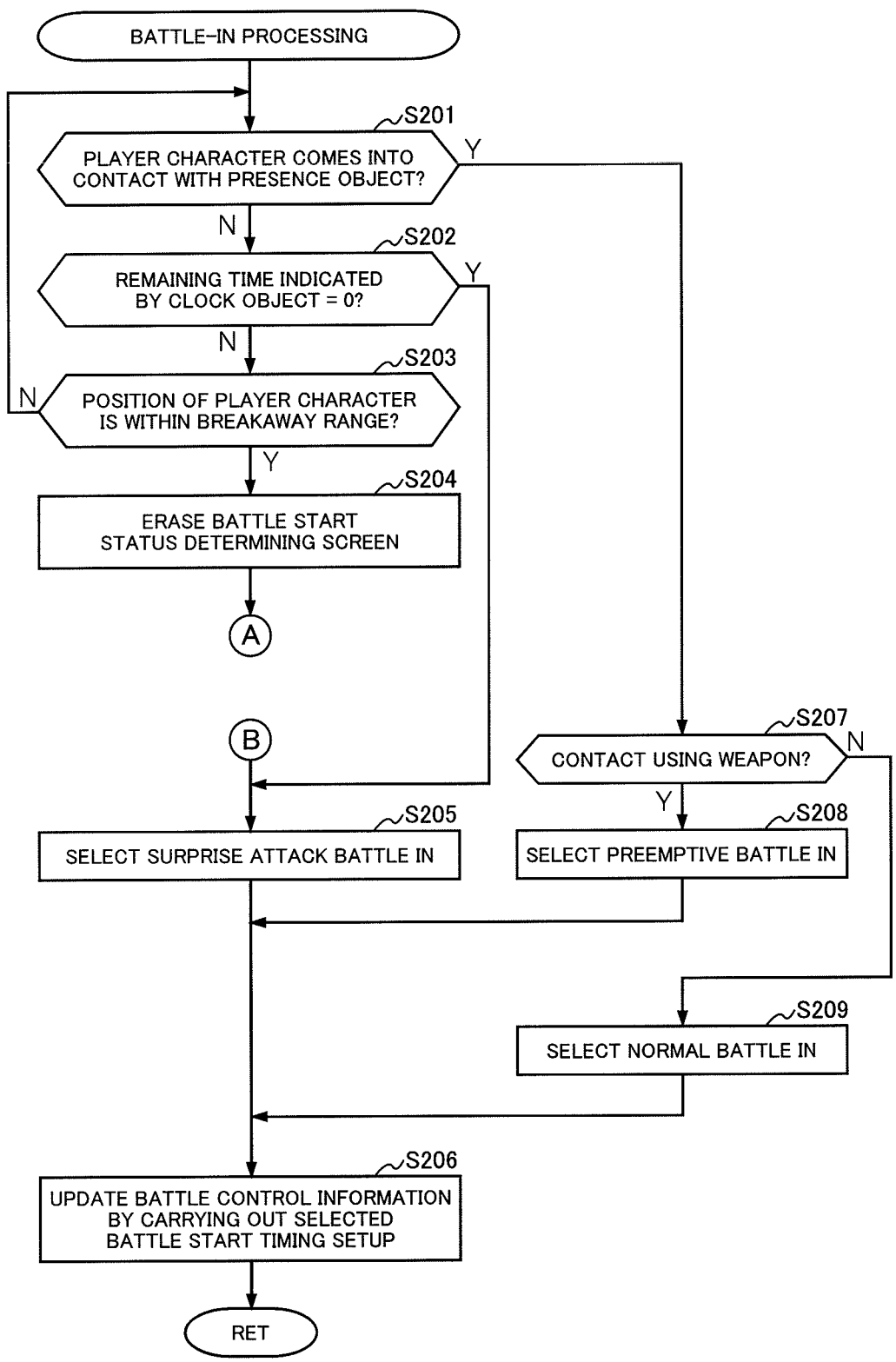
FIG. 13 is a flowchart showing an example of battle-in processing.

FIG. 13 is a flowchart showing an example of the battle-in processing carried out by the video game processing apparatus 100. Here, selection of a battle start timing setup and processes according to the selection are carried out.

In the battle-in processing, the control section 11 first determines whether the player character PC comes into contact with an enemy character NPC or not (Step S201). In the present embodiment, the control section 11 determines whether the player character PC comes into contact with an enemy character NPC on the movement field or not by confirming whether the player character PC comes into contact with the presence object PO or not. In this regard, as a method of determining contact between the player character PC (more specifically, a player character object representing presence of the player character PC on the movement field) and the presence object PO, a conventional determining method (so-called collision detection) using drawing information of the respective objects (the player character PC, the weapon W with which the player character PC equips, and the presence object PO) in the battle start status determining screen (see FIG. 11) is used. Thus, detailed description herein is omitted.

Here, in a case where it is determined that the player character PC does not come into contact with an enemy character NPC ("No" at Step S201), the control section 11 determines whether the remaining time indicated by the clock object CO (that is, a period of time obtained by subtracting the elapsed time from the time when the clock hand CH makes a cycle around the clock object CO) becomes "0" or not (Step S202).

Here, in a case where it is determined that the remaining time indicated by the clock object CO does not become "0" ("No" at Step S202), the control section 11 determines whether the position of the player character PC is within the breakaway range of the enemy character NPC (in the present embodiment, a position away from the presence object PO by the breakaway distance of the enemy character NPC or more) or not (Step S203). Then, in a case where it is determined that the position of the player character PC is not within the breakaway range of the enemy character NPC ("No" at Step S203), the control section 11 causes the processing flow to proceed to the process at Step S201.

On the other hand, in a case where it is determined that the position of the player character PC is within the breakaway range of the enemy character NPC ("Yes" at Step S203), the control section 11 erases the battle start status determining screen (Step S204), and causes the processing flow to proceed to the process at Step S101 in the encounter processing. Namely, the control section 11 causes the player character PC to avoid a battle against the enemy character NPC, and carries out processing to restart movement on the movement field.

On the other hand, in a case where it is determined in the process at Step S202 that the remaining time indicated by the clock object CO is "0" ("Yes" at Step S202), the control section 11 refers to the battle start timing setup storage section 12d, and selects, from plural kinds of battle start timing setups, a battle start timing setup (in the present embodiment, surprise attack battle in, see FIG. 8), in which battle start timing is set up so that a battle is started in a situation that the player character PC is in a disadvantageous condition (Step S205).

When the battle start timing setup is selected, the control section 11 updates the battle control information by carrying out the selected battle start timing setup (Step S206), and causes the processing flow to proceed to the process at Step S110 in the encounter processing (see FIG. 9).

On the other hand, in a case where it is determined in the process at Step S201 that the player character PC comes into contact with an enemy character NPC ("Yes" at Step S201), the control section 11 determines whether the contact is contact using the weapon W or not (Step S207).

Here, in a case where it is determined that the contact of the player character PC with the enemy character NPC is the contact using the weapon W (that is, in a case where it is determined that the player character PC comes into contact with the enemy character NPC on the movement field by confirming the weapon W comes into contact with the presence object PO) ("Yes" at Step S207), the control section 11 refers to the battle start timing setup storage section 12d to select a battle start timing setup, in which battle start timing is set up so that a battle is started in a situation that the player character is in an advantageous state, from the plural kinds of battle start timing setups (in the present embodiment, pre-emptive battle in, see FIG. 8) (Step S208), and causes the processing flow to proceed to the process at Step S206.

On the other hand, in a case where it is determined that the contact of the player character PC with the enemy character NPC is not the contact using the weapon W (in the present embodiment, in a case where it is determined that the player character PC comes into contact with the enemy character NPC on the movement field by confirming that the player character PC comes into contact with the presence object PO) ("No" at Step S207), the control section 11 refers to the battle start timing setup storage section 12d to select the battle start timing setup, in which battle start timing is set up so that a battle is started in a situation that both the player character PC and the enemy character NPC are in a fair state (in the present embodiment, the normal battle in, see FIG. 8) (Step S209), and causes the processing flow to proceed to the process at Step S206.

In this regard, in the embodiment described above, the video game processing apparatus 100 is configured so as to: display the clock object CO in a case where the player character encounters an enemy character NPC; and differentiate the type of setup at the start of the battle in accordance with the remaining time indicated by the clock object CO when the player character PC comes into contact with the enemy character NPC and the like. However, the type of setup at the start of the battle may be differentiated on the basis of other events. In this case, it is thought that, in a case where the player character PC encounters an enemy character NPC, a mini game (for example, an action game, a puzzle game and the like) is provided and the type of setup at the start of the battle is differentiated in accordance with a game result based upon the content of an operation of the player for the mini game, for example.

As explained above, in the embodiment described above, the video game processing apparatus 100 for controlling progress of the video game by causing the display device (for example, the display section 13) to display the movement field on which the player character PC moves and the battle field on which the player character PC carries out a battle against an enemy character NPC on the display screen of the display device in accordance with the progress of the video game, is configured so as to: include the battle control information storage section 12a for storing battle control information therein, the battle control information containing the player character information on the player character and the enemy character information on the enemy character, the battle control information being used for controlling the battle on the battle field; determine whether the player character PC encounters an enemy character NPC on the movement field or not in accordance with a predetermined rule (for example, a probability associated with the position or the like of the player character PC); provide a predetermined event game in a case where it is determined that the player character PC encounters the enemy character NPC, any one determination result being determined from plural kinds of determination results on the basis of the content of an operation of a player in the predetermined event game, the plural kinds of determination results being prepared in advance; select a first battle start timing setup from plural kinds of battle start timing setups (for example, the plurality of battle start timing setups stored in the battle start timing setup storage section 12d) in a case where it is determined to be a specific determination result in the event game, in the first battle start timing setup (for example, the preemptive battle in), battle start timing being set up so that a battle is started in a situation that the player character PC is in an advantageous state, the plural kinds of battle start timing setups being prepared in advance as initial setups at the start of a battle; update the battle control information by carrying out the first battle start timing setup thus selected; and control progress of the battle by starting the battle between the player character PC and the enemy character NPC on the battle field on the basis of the updated battle control information after the battle control information is updated. Therefore, it is possible to carry out control in which variations in situations at the start of the battle of respective characters can be prepared on the basis of an operation of the player when to shift from the movement field to the battle field.

Further, in the embodiment described above, the video game processing apparatus 100 for controlling progress of the video game by causing the display device (for example, the display section 13) to display the movement field on which the player character PC moves and the battle field on which the player character PC carries out the battle against the enemy character NPC on the display screen of the display device in accordance with progress of the video game is configured so as to: include the battle control information storage section 12a for storing battle control information therein, the battle control information containing player character information on the player character and enemy character information on the enemy character, the battle control information being used for controlling the battle on the battle field; determine whether the player character PC encounters an enemy character NPC on the movement field or not in accordance with a predetermined rule (for example, a probability associated with the position or the like of the player character PC); cause the display device to display the presence object PO at the presence position of the enemy character NPC in a case where it is determined that the player character PC encounters the enemy character NPC, the presence object PO representing presence of the enemy character NPC on the movement field; display the clock object CO on the display screen, the clock object CO visibly representing the remaining time information, the remaining time information indicating a remaining time from the time when the player character PC encountered the enemy character NPC to the time when a predetermined time elapses; determine whether the player character PC comes into contact with the enemy character NPC on the movement field or not by confirming whether the player character PC comes into contact with the presence object PO or not; select the first battle start timing setup (for example, the preemptive battle in) from the plural kinds of battle start timing setups (for example, the plurality of battle start timing setups stored in the battle start timing setup storage section 12d) in a case where it is determined that the player character PC comes into contact with the enemy character NPC before the predetermined time elapses, in the first battle start timing setup, battle start timing being set up so that a battle is started in a situation that the player character is in an advantageous state, the plural kinds of battle start timing setups being prepared in advance as initial setups at the start of a battle; update the battle control information by carrying out the selected first battle start timing setup; and control progress of the battle by starting the battle between the player character PC and the enemy character NPC on the battle field on the basis of the updated battle control information after the battle control information is updated. Therefore, it becomes possible to carry out control in which variations in situations at the start of a battle of respective characters can be prepared on the basis of an operation of a player when to shift from a movement field to a battle field. Further, it becomes possible to provide, to the player, information by which the player can recognize that a battle is started in a situation in which either the player character or the enemy character is advantageous before shifting to the battle field.

Namely, by configuring the video game processing apparatus 100 in such a manner that the video game processing apparatus 100 determines the setup at the start of the battle on the basis of elapse of time and contact determination without immediately shifting to the battle field when the video game processing apparatus 100 determines that the player character PC encounters an enemy character NPC, the player is allowed to be responsible for determination of a battle start timing setup. Therefore, it is possible for the player to readily grasp a status at the start of the battle.

Further, since it is possible to readily grasp a battle status of the player character, it is possible to determine how the player character is caused to take an action. This makes it possible to improve interest in the video game of a player. Namely, since the player is allowed to determine whether the battle can be started in a situation that the player character PC is in an advantageous state on the basis of the display form of the clock object CO, the player can determine whether the battle against the enemy character is to be started or avoided on the basis of information provided by the clock object CO. This makes it possible to increase options after the player character PC encounters an enemy character NPC. Therefore, it is possible to improve interest in the video game of the player.

Further, in the embodiment described above, the video game processing apparatus 100 may be configured so as to select, from the plural kinds of battle start timing setups (for example, the preemptive battle in, the normal battle in, and the surprise attack battle in), a second battle start timing setup (for example, the surprise attack battle in) in which battle start timing is set up so that a battle is started in a situation that the player character is in a disadvantageous condition, in a case where it is determined that the player character PC does not come into contact with the enemy character NPC before the predetermined time elapses since the player character PC encountered the enemy character NPC. Therefore, it becomes possible to clearly indicate that the battle is started in a situation that the player character is in a disadvantageous condition if the player character comes into contact with no enemy character before shifting to the battle field. This makes it possible to readily provide information on the situation at the start of the battle to the player.

In this regard, in the embodiment described above, the case where the video game processing apparatus 100 displays the clock object CO including the plurality of areas (for example, the safe area SA and the normal area NA), by which the player can be caused to recognize the period of time in which the presence object PO stops and the period of time in which the presence object PO moves from the time when the player character PC encounters the enemy character NPC to the time when the predetermined time elapses, has been explained as an example. However, the information indicated by the plurality of areas of the clock object CO is not limited to whether the enemy character moves or not. Namely, the areas indicated by the clock object CO may be ones that provide any information to the player.

Therefore, for example, the video game processing apparatus 100 may be configured so as to: display the other clock object (for example, the clock object CO indicating either the safe area SA or the normal area NA) on the display screen, the clock object visibly representing another remaining time information, the another remaining time information representing a first remaining time and a second remaining time, the first remaining time indicating a period of time until a first deadline elapses, the first deadline being a deadline set up before the predetermined time elapses after the player character PC encounters the enemy character NPC, the second remaining time indicating a period of time from the time when the first remaining time is expired to the time when the predetermined time elapses; select the battle start timing setup (for example, the preemptive battle in), in which the battle is started in a situation that the player character PC is in an advantageous state, in a case where it is determined that the player character PC comes into contact with the enemy character NPC before the first remaining time is expired; and select a third battle start timing setup (for example, the normal battle in) in a case where it is determined that the player character PC comes into contact with the enemy character NPC after the first remaining time is expired and before the second remaining time is expired, in the third battle start timing setup, battle start timing being set up so that a battle is started in a situation that both the player character PC and the enemy character NPC are in a fair state. By configuring the video game processing apparatus 100 in this manner, it becomes possible to prepare variations in setups at the start of a battle. Further, only by increasing the types of remaining time until the predetermined time elapses to three or more, it becomes possible to easily increase variations in the setups at the start of a battle.

Further, in the embodiment described above, the video game processing apparatus 100 may be configured so as to: control an action of the player character PC on the movement field in response to an operation by the player A; change the display form of the player character PC into a state that the player character is equipped with a predetermined item (for example, the weapon W with which the player character PC equips) in a case where it is determined that the player character PC encounters the enemy character NPC; determine whether the contact is contact using the predetermined item or not in a case where it is determined that the player character PC comes into contact with the enemy character NPC; select the first battle start timing setup (for example, the preemptive battle in) in which the battle start timing is set up so that a battle is started in a situation that the player character PC is in an advantageous state in a case where a determination result indicates that the contact of the player character PC with the enemy character NPC is the contact using the predetermined item; and select the third battle start timing setup (for example, the normal battle in) in which the battle start timing being set up so that a battle is started in a situation that both the player character PC and the enemy character NPC are in a fair state in a case where the determination result indicates that the contact of the player character PC with the enemy character NPC is not the contact using the predetermined item. Therefore, it is possible to determine whether either the player character PC or the enemy character NPC is in an advantageous state at the start of the battle in accordance with the content of an operation by the player. Further, since the content of an operation of the player is reflected to the setup at the start of the battle, the player can easily grasp a situation at the start of a battle.

Further, in the embodiment described above, the video game processing apparatus 100 may be configured so as to: include the clock object managing table 12c for storing the clock object information that is information on the clock object, containing the predetermined time; update the predetermined time on the basis of at least one piece of information among the information on the movement field, the player character information and the enemy character information (for example, update the predetermined time in the clock object information in accordance with the encounter type and the enemy character information determined in accordance with the enemy character information); and display the clock object CO on the display screen on the basis of the clock object information stored in the clock object managing table 12c. Therefore, only by changing a parameter related to the content of clock object information such as the enemy character information, it becomes possible to provide an appearance pattern of each of various kinds of enemy characters.

Further, in the embodiment described above, the video game processing apparatus 100 may be configured so as to: specify the distance between the player character PC and the presence object PO on the movement field; determine whether or not the specified distance is a predetermined distance (for example, the breakaway distance in the enemy character information) or longer; in a case where it is determined that the distance between the player character PC and the presence object PO is the predetermined distance or longer, erase the presence object from the movement field and terminate display of the clock object CO (for example, erase the battle start status determining screen). Therefore, it becomes possible to provide, to the player, an opportunity to take into consideration an action of the player character against an enemy character after the player character encounters the enemy character and before the battle is started, and this makes it possible to improve interest in the video game of a player.

Further, in the embodiment described above, the video game processing apparatus 100 may be configured so as to: determine whether the player character information satisfies a predetermined condition (for example, there is a surprise attack preventing character in the family) or not before the presence object PO is displayed in a case where it is determined that the player character PC comes into contact with the enemy character NPC; carry out the encounter determination between the player character PC and the enemy character NPC in a case where it is determined that the player character information satisfies the predetermined condition (for example, in a case where it is determined that there is a surprise attack preventing character M in the family); and selects the second battle start timing setup (for example, the surprise attack battle in) in which the battle start timing is set up so that a battle is started in a situation that the player character is in a disadvantage state in a case where it is determined that the player character information does not satisfy the predetermined condition. Therefore, it becomes possible to prepare variations in the process carried out at the start of a battle in accordance with a status of the player character before the player character encounters an enemy character.

In this regard, although it has not been mentioned in particular in the embodiment described above, the video game processing apparatus 100 may be configured so as to: carry out the encounter determination between the player character PC and a group of enemy characters constituted by a plurality of enemy characters; and update the predetermined time on the basis of the number of a plurality of enemy characters (for example, the predetermined time is set to longer in accordance with the number of enemy characters). By configuring the video game processing apparatus 100 in this manner, the player is allowed to adjust a period of time to determine whether to carry out a battle in accordance with the configuration of the group of enemy characters.

In this regard, although it has not been mentioned in the embodiment described above in particular, the video game processing apparatus 100 may be configured so as to display a plurality of presence objects and clock objects respectively corresponding to the plurality of presence objects on the display screen at one encounter. In this case, the video game processing apparatus 100 may be configured so as to receive, via the player operation receiving section 15, a request to carry out a process to integrate the plurality of presence objects into one presence object and a process to integrate the plurality of clock objects corresponding to the plurality of presence objects into one clock object. By configuring the video game processing apparatus 100 in this manner, it becomes possible to cause the player to determine that the battle is easily started in an advantageous situation instead of taking a battle against the enemy character corresponding to the plurality of presence objects. This makes it possible to improve interest in the video game of a player.

Further, in the embodiment described above, the video game processing apparatus 100 may be configured so as to: include the clock hand CH, the initial position IP of the clock hand CH and the action end position EP of the clock hand CH; and display the object, which operates in accordance with the remaining time until the predetermined time elapses and operates so that the clock hand CH is positioned at the action end position EP of the clock hand CH when the remaining time is expired, as the clock object CO. Therefore, it is possible to cause the player to grasp information on elapse of time (for example, a remaining time until the battle is started forcibly, and the like) with his or her intuition.

In this regard, although it has not been referred to in the embodiment described above in particular, the video game processing apparatus 100 may be configured so as to determine a process after the player character PC loses the battle against the enemy character NPC in accordance with the content of the selected battle start timing setup. Namely, for example, the video game processing apparatus 100 may be configured so as to: select at least one or more battle start timing setup (for example, the preemptive battle in) from the plural kinds of battle start timing setups prepared in advance as the initial setups at the start of the battle; store the type of the selected battle start timing setup in a storage region of a predetermined storage device; update the battle control information by carrying out the selected battle start timing setup; after the battle control information is updated, start the battle between the player character PC and the enemy character NPC on the battle field on the basis of the updated battle control information; control progress of the battle; determine whether the battle is terminated or not; determine whether to have a fresh start for the battle or not in a case where it is determined that the battle is terminated; and display (or arrange) the player character PC and the presence object PO corresponding to the enemy character NPC on the movement field after restriction set up in advance in accordance with the type of the stored battle start timing setup is set up in a case where it is determine to have a fresh start for the battle.

Namely, for example, the video game processing apparatus 100 may be configured so that, in a case where the battle is started as the normal battle in and a fresh start for the battle is carried out (hereinafter, referred to appropriately as "restart the battle"), the control section 11 arranges the player character PC and the presence object PO on the movement field; displays the battle start status determining screen for displaying the clock object CO, in which the elapsed time is "0", and the movement field (see FIG. 11); and receives an operation (for example, a movement operation of the player character PC) other than usage of a predetermined item (for example, the weapon W) regarding an action of the player character PC. By configuring the video game processing apparatus 100 in this manner, for example, it becomes possible to easily carry out design of the video game so that a probability of advantage taken at first is ensured but the player character PC cannot return to more advantageous state.

In this regard, restriction at the restart is not limited to restriction regarding an action of the player character. For example, the video game processing apparatus 100 may be configured so that, in a case where the battle is to be restarted when the selected battle start timing setup is the "preemptive battle in" before start of a battle, "the clock object is returned and the player character PC can normally come into contact with an enemy character NPC using the predetermined item". The video game processing apparatus 100 may also be configured so that, in a case where the battle is to be restarted when the battle start timing setup is the "surprise attack battle in", "the predetermined time corresponding to the clock object is displayed so as to be shorter". Further, for example, the video game processing apparatus 100 may be configured so that, in a case where the selected battle start timing setup is "surprise attack battle in" before start of the battle, the control section 11 locks the restart (that is, does not permit the restart).

In this regard, in the embodiment described above, the video game processing apparatus 100 has been configured so as to carry out various kinds of processing such as the game processing described above on the basis of the game program read out from the game cartridge 20. However, the game program may be acquired from a game server via a communication network such as the Internet. Further, the video game processing apparatus 100 may serve as a game server to provide a game terminal with the game program via a communication network.

Further, in the embodiment described above, the video game processing apparatus 100 carries out various kinds of processing described above in accordance with a control program (for example, the video game processing program) stored in a storage device (the storage section 12) equipped by the video game processing apparatus 100.

The present invention is useful to carry out control in which variations in situations at the start of a battle of respective characters can be prepared on the basis of an operation of a player when to shift from a movement field to a battle field.

What is claimed is:

1. A video game processing apparatus for controlling progress of a video game by causing a display device to display a movement field and a battle field on a display screen of the display device in accordance with the progress of the video game, a player character moving on the movement field, the player character carrying out a battle against an enemy character on the battle field, the video game processing apparatus comprising:

a processor; and a memory including a set of executable instructions that, when executed by the processor, causes the processor to perform operations including:

storing battle control information in a battle control information memory, the battle control information containing player character information on the player character and enemy character information on the enemy character, the battle control information being used for controlling the battle on the battle field;

determining whether the player character encounters an enemy character on the movement field in accordance with a predetermined rule;

providing a predetermined event game when the player character encounters the enemy character, any one determination result being determined from plural kinds of determination results on the basis of an operation of a player in the predetermined event game, the plural kinds of determination results being prepared in advance;

selecting a first battle start timing setup from plural kinds of battle start timing setups when it is determined to be a specific determination result in the predetermined event game, in the first battle start timing setup, battle start timing being set up so that the battle is started in a situation that the player character is in an advantageous state, the plural kinds of battle start timing setups being prepared in advance as initial setups at the start of the battle;

updating the battle control information by carrying out the first battle start timing setup selected by the battle start timing setup selector; and controlling progress of the battle by starting the battle between the player character and the enemy character on the battle field on the basis of the updated battle control information after the battle control information is updated, wherein the predetermined event game includes:

displaying, on the display screen of the display device, a battle start status determining screen including a presence object and a clock object, the presence object being displayed in association with a presence position of the enemy character on the movement field and representing presence of the enemy character, the clock object visibly representing a first remaining time period and a second remaining time period, the first remaining time period being from when the player character encountered the enemy character to when a first deadline expires, the second remaining time period being from when the first deadline expires to when a predetermined time elapses; and determining the determination result based on whether the player character contacts the presence object during one of the first remaining time period and the second remaining time period.

2. The video game processing apparatus according to claim 1, wherein, when providing the predetermined event game, the operations further include:

displaying the presence object on the display screen at the presence position;

displaying the clock object on the display screen; and determining whether the player character comes into contact with the presence object, wherein, the first battle start timing setup is determined to be the specific determination result when the player character comes into contact with the presence object before the first remaining time period elapses.

3. The video game processing apparatus according to claim 2, wherein a second battle start timing setup is selected from the plural kinds of battle start timing setups when the player character does not come into contact with the presence object before the predetermined time elapses, in the second battle start timing setup, battle start timing being set up so that the battle is started in a situation that the player character is in a disadvantageous state.

4. The video game processing apparatus according to claim 2, wherein a third battle start timing setup is selected when the player character comes into contact with the presence object after the first remaining time period is expired and before the second remaining time period is expired, in the third battle start timing setup, battle start timing being set up so that the battle is started in a situation that both the player character and the enemy character are in a fair state.

5. The video game processing apparatus according to claim 2, the operations further comprising:

controlling an action of the player character on the movement field in response to an operation by the player; and changing a display form of the player character into a state that the player character is equipped with a predetermined item when the player character encounters the enemy character, wherein the processor determines, when it is determined that the player character contacts the presence object, whether the contact is contact using the predetermined item or not, wherein the first battle start timing setup in which the battle start timing is set up so that the battle is started in the situation that the player character is in the advantageous state is selected when the contact of the player character with the presence object is the contact using the predetermined item, and wherein a second battle start timing setup in which the battle start timing is set up so that the battle is started in a situation that both the player character and the enemy character are in a fair state is selected when the contact of the player character with the presence object is not the contact using the predetermined item.

6. The video game processing apparatus according to claim 2, the operations further comprising:

storing clock object information in a clock object information memory, the clock object information being information on the clock object containing the predetermined time; and updating the predetermined time on the basis of at least one of information on the movement field, the player character information, and the enemy character information, wherein the clock object is displayed on the display screen on the basis of the clock object information stored in the clock object information memory.

7. The video game processing apparatus according to claim 2, the operations further comprising:

specifying a distance between the player character and the presence object on the battle start status determining screen; and determining whether the distance is at least a predetermined distance, wherein, when the distance between the player character and the presence object is at least the predetermined distance, the presence object is erased from the battle start status determining screen, and display of the clock object is terminated.

8. The video game processing apparatus according to claim 2, the operations further comprising:
determining whether the player character information satisfies a predetermined condition before the presence object is displayed when the player character comes into contact with the enemy character,
wherein an encounter determination is carried out when the player character information satisfies the predetermined condition, and
wherein a second battle start timing setup in which the battle start timing is set up so that the battle is started in a situation that the player character is in a disadvantage state is selected when the player character information does not satisfy the predetermined condition.

9. The video game processing apparatus according to claim 2, wherein an encounter determination includes encounter determination between a group of enemy characters constituted by a plurality of enemy characters and the player character, and
wherein the predetermined time is updated on a basis of a number of the plurality of enemy characters.

10. The video game processing apparatus according to claim 2, wherein the clock object includes:
a clock hand;
an initial position of the clock hand; and
an action end position of the clock hand, and
wherein an object is displayed on the display screen as the clock object, the object operating in accordance with remaining time until the predetermined time elapses, the object also operating so that the clock hand is positioned at the action end position of the clock hand when the remaining time is expired.

11. A non-transitory computer-readable medium containing video game processing program product for causing a video game processing apparatus to control an operation of a video game, the video game processing apparatus controlling progress of a video game by causing a display device to display a movement field and a battle field on a display screen of the display device in accordance with progress of the video game, a player character moving on a movement field, the player character carrying out a battle against an enemy character on the battle field, the video game processing program product causing the video game processing apparatus to execute:
determining whether the player character encounters the enemy character on the movement field in accordance with a predetermined rule;
providing a predetermined event game by displaying a battle start status determining screen when it is determined that the player character encounters the enemy character, the battle start status determining screen including a presence object displayed in association with a presence position of the enemy character on the movement field and representing presence of the enemy character;
displaying a clock object on the battle start status determining screen, the clock object visibly representing a first remaining time period and a second remaining time period, the first remaining period being from when the player character encountered the enemy character to when a first deadline expires, the second remaining time period being from when the first deadline expires to when a predetermined time elapses;
determining whether the player character comes into contact with the presence object;
selecting a first battle start timing setup from plural kinds of battle start timing setups when it is determined that the player character comes into contact with the enemy character before the first remaining time period elapses during the predetermined event game, in the first battle start timing setup, battle start timing being set up so that the battle is started in a situation that the player character is in an advantageous state, the plural kinds of battle start timing setups being prepared in advance as initial setups at the start of the battle;
updating battle control information stored in a battle control information memory by carrying out the first battle start timing setup, the battle control information containing player character information on the player character and enemy character information on the enemy character, the battle control information being used for controlling the battle between the player character and the enemy character on the battle field; and
controlling progress of the battle by starting the battle between the player character and the enemy character on the battle field on the basis of the updated battle control information
wherein the plural kinds of battle start timing setups are selected based on whether the player character contacts the presence object during one of the first remaining time period and the second remaining time period.

12. The video game processing apparatus according to claim 1, wherein the enemy character information includes a hit point of the enemy character.

13. The non-transitory computer-readable medium according to claim 11, wherein the enemy character information includes a hit point of the enemy character.

* * * * *